(12) United States Patent
Mannheim Astete et al.

(10) Patent No.: US 11,305,516 B2
(45) Date of Patent: Apr. 19, 2022

(54) AUTOMOTIVE LAMINATE WITH HOLE

(71) Applicant: AGP AMERICA S.A., Ciudad de Panamá (PA)

(72) Inventors: Mario Arturo Mannheim Astete, Lima (PE); Charles Stephen Voeltzel, Lima (PE); Juan Pablo Suarez, Lima (PE); Vincenzo Mannino, Lima (PE)

(73) Assignee: AGP America S.A., Panama (PA)

( * ) Notice: Subject to any disclaimer, the term of this patent is extended or adjusted under 35 U.S.C. 154(b) by 119 days.

(21) Appl. No.: 16/499,677

(22) PCT Filed: Mar. 27, 2018

(86) PCT No.: PCT/IB2018/052106
§ 371 (c)(1),
(2) Date: Sep. 30, 2019

(87) PCT Pub. No.: WO2018/178882
PCT Pub. Date: Oct. 4, 2018

(65) Prior Publication Data
US 2020/0114624 A1    Apr. 16, 2020

Related U.S. Application Data

(60) Provisional application No. 62/478,561, filed on Mar. 29, 2017.

(30) Foreign Application Priority Data

Jul. 27, 2017    (CO) .................... NC2017/0007445

(51) Int. Cl.
*B32B 17/10*    (2006.01)
*B60J 1/00*    (2006.01)
*C03C 3/04*    (2006.01)

(52) U.S. Cl.
CPC .. *B32B 17/10036* (2013.01); *B32B 17/10293* (2013.01); *B32B 17/10366* (2013.01); *B60J 1/008* (2013.01); *C03C 3/04* (2013.01)

(58) Field of Classification Search
CPC ........ B32B 17/10036; B32B 17/10366; B32B 17/10293; B60J 1/008
(Continued)

(56) References Cited

U.S. PATENT DOCUMENTS 4,124,367 A  * 11/1978  Reese ............... B32B 17/10036
                                                    65/104
4,299,639 A    11/1981  Bayer
(Continued)

FOREIGN PATENT DOCUMENTS

| CO | 2017007600 A1 | 1/2018 |
| CO | 2017012219 A1 | 2/2018 |

(Continued)

OTHER PUBLICATIONS

Machine_English_translation_of_RU_130269_U1; Molnar, B; et. al.; Insert Element Rear Window Motor Vehicle Hole Lower Edge Incorporate Wipe Shaft Windscreen Notch Laminate Glass; Jul. 20, 2013; EPO; whole document (Year: 2013).*

*Primary Examiner* — Tahseen Khan
(74) *Attorney, Agent, or Firm* — The Morales Law Firm; Joseph L. Morales

(57) ABSTRACT

Laminated glazing, once limited to just the windshield, is finding more and more application in other positions on the vehicle due to its ability to improve passenger safety, security and comfort. Problems are encountered when producing a laminated version of a tempered part with holes, because tempered glass is 4 to 5 times stronger than annealed glass. The laminate of the invention has a hole in the exterior glass layer. An insert is bonded to a cutout in the area of the hole on the interior glass layer so as to reinforce (Continued)

the hole and distribute the load over a wider area. The result is a laminated glazing with one or more holes that has the reliability of and is a direct replacement for a tempered part.

25 Claims, 9 Drawing Sheets

(58) Field of Classification Search
USPC .......................................................... 428/212
See application file for complete search history.

(56) References Cited

U.S. PATENT DOCUMENTS

| | | |
|---|---|---|
| 5,350,637 A | 9/1994 | Ketcham |
| 2012/0320621 A1 | 12/2012 | Kleo |
| 2013/0302581 A1 * | 11/2013 | Mannheim Astete ....................... B32B 17/10064 428/214 |
| 2014/0023457 A1 | 1/2014 | Gaudron et al. |
| 2015/0236491 A1 * | 8/2015 | Bureloux .......... B32B 17/10036 174/650 |
| 2016/0054492 A1 * | 2/2016 | Ihara ....................... C03C 3/087 359/359 |
| 2016/0243796 A1 * | 8/2016 | Mannheim Astete ....................... B32B 17/1077 |

FOREIGN PATENT DOCUMENTS

| | | | | |
|---|---|---|---|---|
| DE | 4311442 C1 | 7/1994 | | |
| DE | 20107806 U1 | 2/2002 | | |
| RU | 130269 U1 * | 7/2013 | ....... | B32B 17/10036 |
| WO | WO-2004011755 A1 * | 2/2004 | .......... | E04F 13/0837 |

* cited by examiner

AUTOMOTIVE LAMINATE WITH HOLE

FIELD OF THE INVENTION

This invention relates to the field of laminated automotive glazing.

BACKGROUND OF THE INVENTION

A trend in the automotive industry has been the extended use of laminated glazing. Laminated glazing, once limited to just the windshield, is finding more and more application in other positions in the vehicle to improve passenger safety, security, and comfort, as well as energy efficiency.

Laminated windshields are made by bonding two sheets of annealed glass together using a thin sheet of a transparent thermo plastic. Annealed glass is glass that has been slowly cooled from the bending temperature, down through the glass transition range. This process relieves any stress left in the glass from the bending process. Annealed glass breaks into large shards with sharp edges.

When laminated glass breaks, the shards of broken glass are held together, much like the pieces of a jigsaw puzzle by the plastic layer, helping to maintain the structural integrity of the glass. As a result, for example, vehicle with a broken windshield can still be operated. On impact, the plastic layer also helps to prevent penetration by the occupant in the event of a crash and by objects striking the laminate from the exterior.

Heat strengthened (tempered) glass can be used in all vehicle positions other than the windshield. Heat strengthened (tempered) glass has a layer of high compression on the outside surfaces of the glass, balanced by tension on the inside of the glass. When tempered glass breaks, the tension and compression are no longer in balance and the glass breaks into small beads with dull edges.

Tempered glass is much stronger than annealed laminated glass. Glass thickness limits of the typical automotive heat strengthening process for tempered glass are in the 3.2 mm to 3.6 mm range. Thinner glass cannot be strengthened to the level needed to meet regulatory requirements for safety glazing with conventional low pressure air tempering systems of common use in the automotive glass industry.

Glass used in doors, rear and side windows of most vehicles is made from tempered glass. While laminated glass is allowed for these positions, tempered glass can be produced at a lower cost than laminated glass. Tempered glass can withstand high loads but can be easily broken by striking with a hard object. When tempered glass fails, the entire window opening is left unprotected.

As a result, in some vehicles, laminated glass has been used for the doors and some other positions instead of tempered glass. This is in part to improve the safety and security of the occupants. It takes much longer to break into a vehicle with laminated glass. Laminated glass also provides improved sound dampening for a quieter ride. The soft plastic layer decouples the two glass layers, helping to reduce the transmission of sound through the glass. A laminate also allows for the use of heat reflecting coatings and films, which require lamination to protect the coating/film, for improved solar control. Laminated glass has also been used to improve occupant retention in the event of a rollover accident.

Problems are encountered when manufacturing a laminated version of a tempered part, when the tempered part has holes. Holes are commonly used in tempered parts to attach and mount the glass to the vehicle. For example, lift gate windows often require a large hole for mounting.

Laminated glass is not typically manufactured with holes for a number of reasons. The primary one is that annealed glass is not as strong as tempered glass. Fully tempered glass is 4 to 5 times stronger than annealed laminated glass. As mentioned, glass that is less than 3.2 mm thick, cannot be fully tempered. Thinner glass can be heat strengthened but not to the same degree. Thus, a laminated version of a tempered part will have a higher probability of breakage and may not be possible to use in some applications.

When looking at glass at the molecular level, it is expected that its strength is in the 45 GPa range. However, we find that the actual strength is orders of magnitude lower than the predicted potential strength. Raw flat glass produced by the float process, appears to be nearly perfect to the naked eye. However, during manufacture, the glass is inspected by machine and any visible defects are detected and discarded. The near visually perfect glass will still have surface defects at the microscopic level. These come from contact with the float line rollers, cutting, handling, interleaving material, contact with other plates of glass and various other sources. Additional defects are introduced during the glass bending process. Distribution and severity of these defects on the surface are random and follow a normal distribution.

Glass has very high compressive strength and almost always fails in tension due to these surface defects. Under compression, this surface defects are forced in the closed direction and do not open. But, under tension, surface defects are pulled in the open direction. Surface defects or cracks serve as the weakest link under tension. Due to the near perfect elastic behavior of glass, the defects cannot deform to relieve the stress but instead do the opposite, acting as stress concentrators. Surface defects, most of which are microscopic on new glass, when stressed in the open direction, will grow if the stress is above a certain critical value. This is known as slow crack growth (SCG), which is not a linear function. Crack growth accelerates with tension and duration.

When a part containing a hole is tempered, the entire surface of the part including the edges of the hole, is placed under compression. For the part to break, the part must be loaded beyond its compressive strength and placed in tension. This is why tempered parts are so much stronger. An annealed part, when loaded, will go into tension at a much lower level.

Another problem is related to tolerance stack. For each hole in the laminate, holes must be drilled in both the interior glass and the exterior glass layers. Each hole has a location and diameter tolerance plus a mismatch tolerance of the two glass layers relative to each other in the laminate. As a result, the hole cannot be located as accurately as in a tempered part. To compensate, the hole diameter must be increased.

It would be desirable overcome these limitations providing for a laminated glazing with one or more holes as a direct replacement of a tempered part.

SUMMARY OF THE INVENTION

The invention provides for a laminated glazing with at least one hole. The outer, exterior facing glass layer is fabricated to the nominal glass size and with holes drilled through, as needed. On the inner or interior facing glass layer, a cut out is made in the glass in the area of the hole. An insert, of about the same thickness as the interior glass layer, with a hole, is fabricated to fit the cutout. The insert is then aligned with the hole in the exterior surface and then laminated by means of a laminate plastic layer, as a permanent part of the glazing. Insert strengthens the glass and distribute any forces applied to the hole. Insert may have a hole that is smaller than the hole in the exterior glass layer.

The laminated glazing of the invention, enables the use of laminated glazing with holes, directly replacing tempered parts, but providing the same or better durability as the tempered glass, with the same or less thickness, given the possible use of ultra-thin glass.

Advantages of the present invention include:
Lower weight;
Improved security;
Improved safety;
Improved comfort;
Superior acoustic dampening;
Superior solar control.

The laminated glazing of the invention can be fabricated using standard automotive glass processes.

BRIEF DESCRIPTION OF THE DRAWINGS

These features and advantages of the present invention will become apparent from the detailed description of the following embodiments in conjunction with the accompanying drawings, wherein.

DETAILED DESCRIPTION OF THE INVENTION

Figure 1:
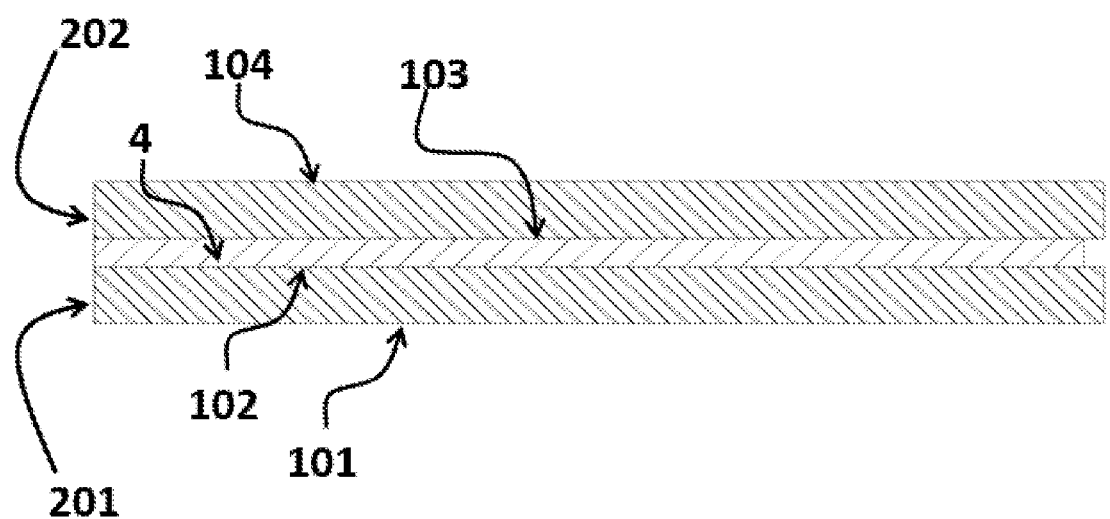
FIG. 1 shows a typical laminated glass.
Figure 2A:
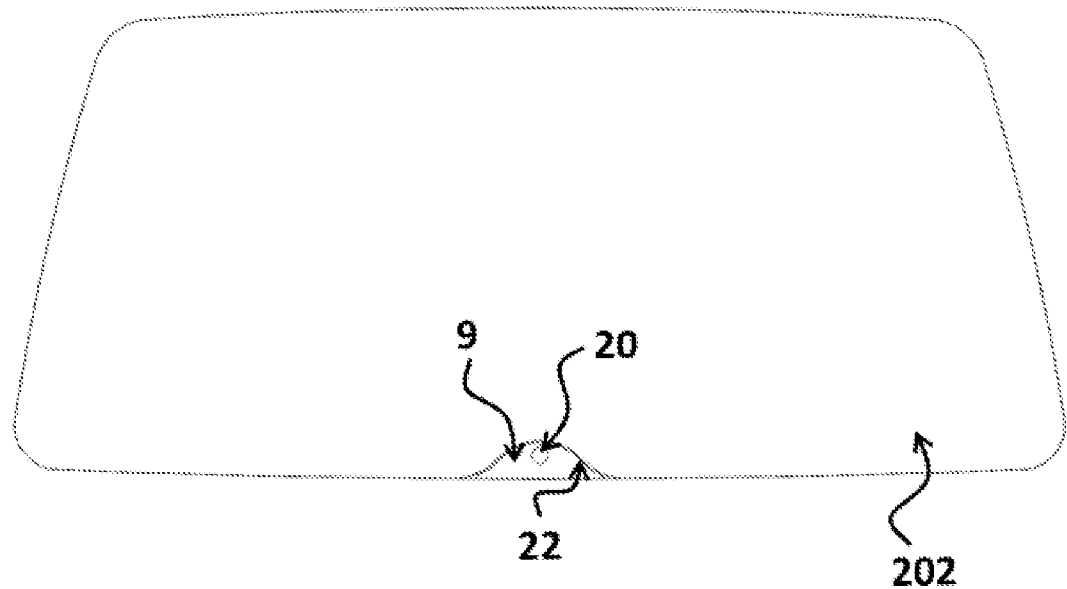
FIG. 2A shows a plan view of a laminate with hole, cutout and insert.
Figure 2B:
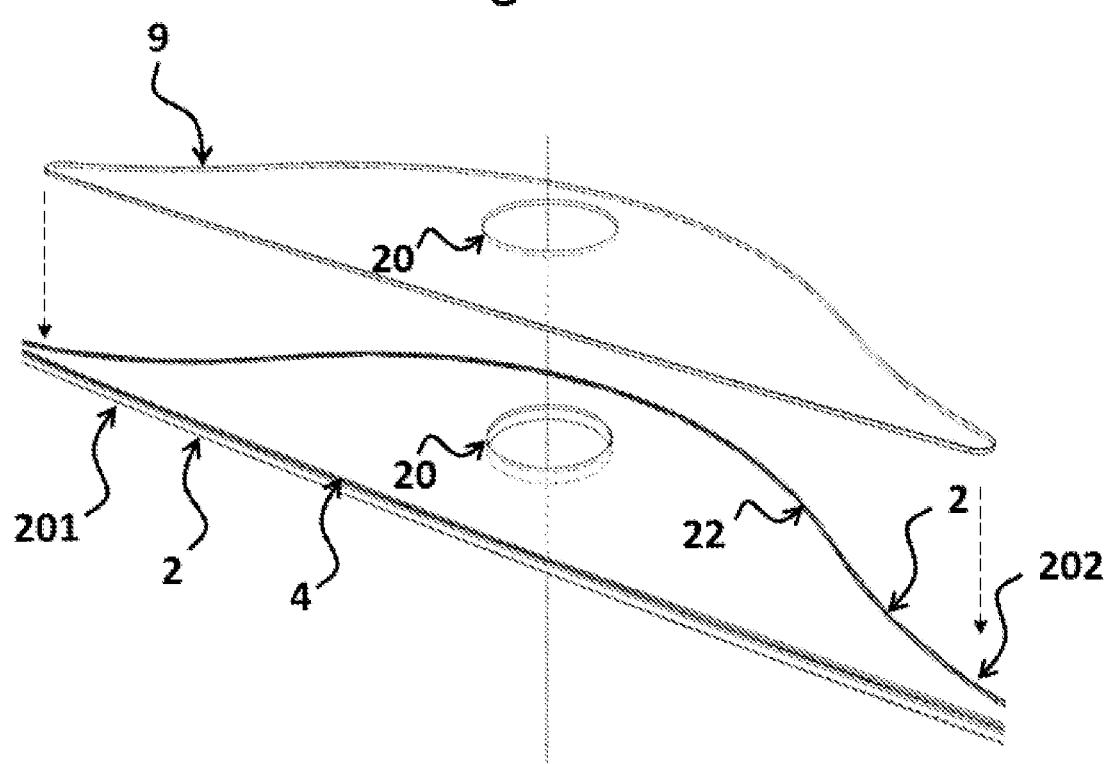
FIG. 2B shows an exploded view of an insert and cutout.
Figure 3A:
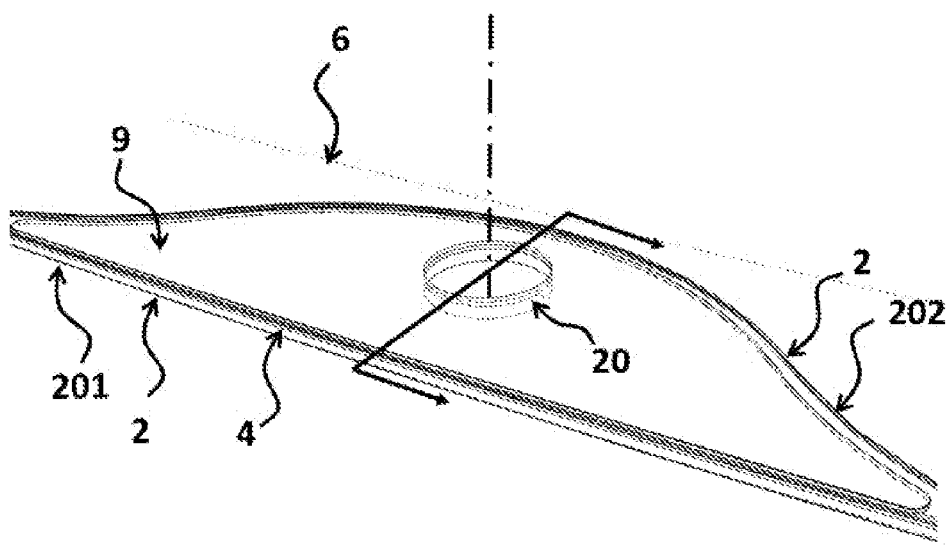
FIG. 3A shows a detail of a laminate with hole, cutout and insert.
Figure 3B:
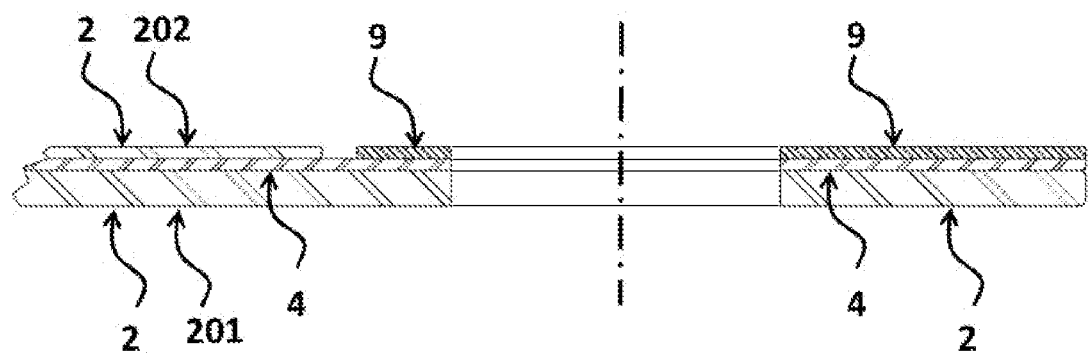
FIG. 3B shows a cross section of the detail of the laminate of FIG. 2A.

In the drawings and specification, the following terminology is used to describe the configuration of a laminated glazing. A typical automotive laminate, as shown in FIG. 1, is comprised of two layers of glass, the exterior or outer 201 and the interior or inner 202 that are permanently bonded together by a plastic bonding layer 4 (interlayer). The glass surface that is on the exterior of the vehicle of layer 201 is referred to as surface one 101 or the number one surface. The opposite face of the exterior layer 201 (inner surface of the exterior glass layer) is surface two 102 or the number two surface. The glass surface on the interior of the vehicle is referred to as surface four 104 or the number four surface. The opposite face of the interior surface of glass 202 (inner surface of the interior glass layer) is referred to as surface three 103 or the number three surface. Surfaces two 102 and three 103 are bonded together by the plastic bonding layer 4.

The plastic bonding layer 4 has the primary function of bonding the major faces of adjacent layers to each other. The material selected is typically a clear plastic bonding to another glass layer. For automotive use, the most commonly used bonding layer 4 or interlayer is polyvinyl butyl (PVB). In addition to polyvinyl butyl, ionoplast polymers, ethylene vinyl acetate (EVA), cast in place (CIP), liquid resin and thermoplastic polyurethane (TPU) can also be used.

Interlayers are available with enhanced capabilities beyond bonding glass layers together. For example, the invention may include interlayers designed to dampen sound. Such interlayers are comprised whole or in part of a layer of plastic that is softer and more flexible than that normally used.

The types of exterior and interior glass that may be used in the present invention, include but are not limited to: common soda-lime variety, typical of automotive glazing, as well as aluminosilicate, lithium aluminosilicate, borosilicate, glass ceramics, and various other inorganic solid amorphous compositions which undergo a glass transition and are classified as glass included those that are not transparent.

Glass layers may be comprised of heat absorbing glass compositions, as well as infrared reflecting and other types of coatings. Infrared reflecting coatings include but are not limited to various metal/dielectric layered coatings applied though magnetron sputtered vacuum deposition (MSVD) as well as others known in the art that are applied via pyrolytic, spray, CVD, dip and other methods. Infrared reflecting films include both metallic coated substrates as well as organic based optical films which reflect in the infrared.

Glass layers may be annealed or strengthened. There are two processes that can be used to increase the strength of glass. They are thermal strengthening, in which hot glass is rapidly cooled (quenched) and chemical tempering which achieves the same effect through an ion exchange chemical treatment. In chemical tempering processes, ions in and near the outside surface of the glass are exchanged with larger ions. This places the outer layer of glass in compression. Compressive strengths of up to 1,000 Mpa are possible.

The use of thin glass layers has been found to improve resistance to breakage from impact, such as from stone chips. Thinner glass is more flexible and absorbs the energy of the impact by deflecting and then bouncing back, rather than breaking as is the case with a thicker stiffer layer of glass. Embodiments comprising a borosilicate exterior layer are substantially more resistant to impact than soda lime glass, due to the nature of the composition. Embodiments comprising a chemically tempered layer will also exhibit superior resistance to impact as compared to ordinary soda-lime glass due to the high surface compression of such glasses.

The invention, as shown in FIGS. 2A, 2B, 3A and 3B, is comprised of a laminate having two glass layers 2, exterior layer 201 and interior layer 202, with each having opposing major faces bonded together permanently by at least one plastic bonding layer 4 and having at least one hole 20.

The exterior layer 201 is cut and the hole 20 or holes are cut in the same manner as would for a tempered part. No holes are cut in the interior glass layer 202. Instead, a cutout 22 is made in the interior glass 202, such as to expose the inner surface 102 (FIG. 1) of the exterior glass layer 201 in the areas in and surrounding the hole(s) 20. The cutout 22 area for each hole 20 is larger than each hole 20.

An insert 9, is fabricated to fit into the cutout 22. The insert 9 contains a hole 20 located, such that the hole 20 in the insert will align with the hole 20 in the exterior glass layer 201, when placed into the cutout 22. Sufficient clearance must be allocated to allow the two holes 20 to align taking into account the tolerance stack. For the embodiments obtained, there is a 3mm gap between insert 9 and the edge of the cutout 22 in the interior glass layer 202. For a direct replacement of a tempered part, the insert 9 should be about the same thickness as the interior glass layer 202, at least in any areas where clearance is needed. These areas may include, but are not limited to the region along the edge of glass where the glass is bonded into the vehicle on fixed glass parts that do not move. On a movable door window, the area that attaches to the lift rail must be the same thickness as on the tempered part if the two types of glass are to be interchangeable.

Figure 4A:
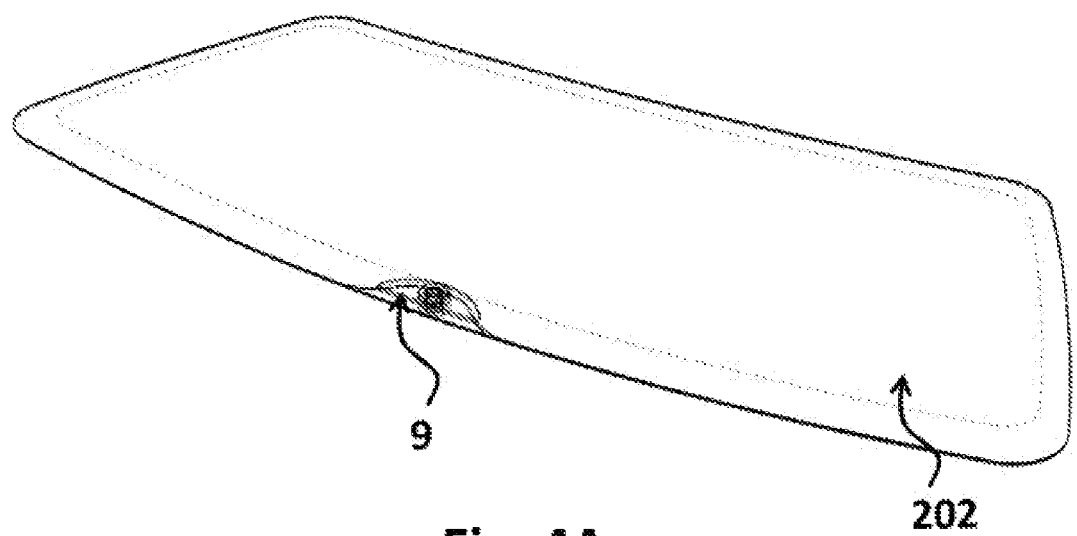
FIG. 4A shows an isometric view of a laminate with hole, cutout, insert, sleeve, retainers and plate.
Figure 4B:
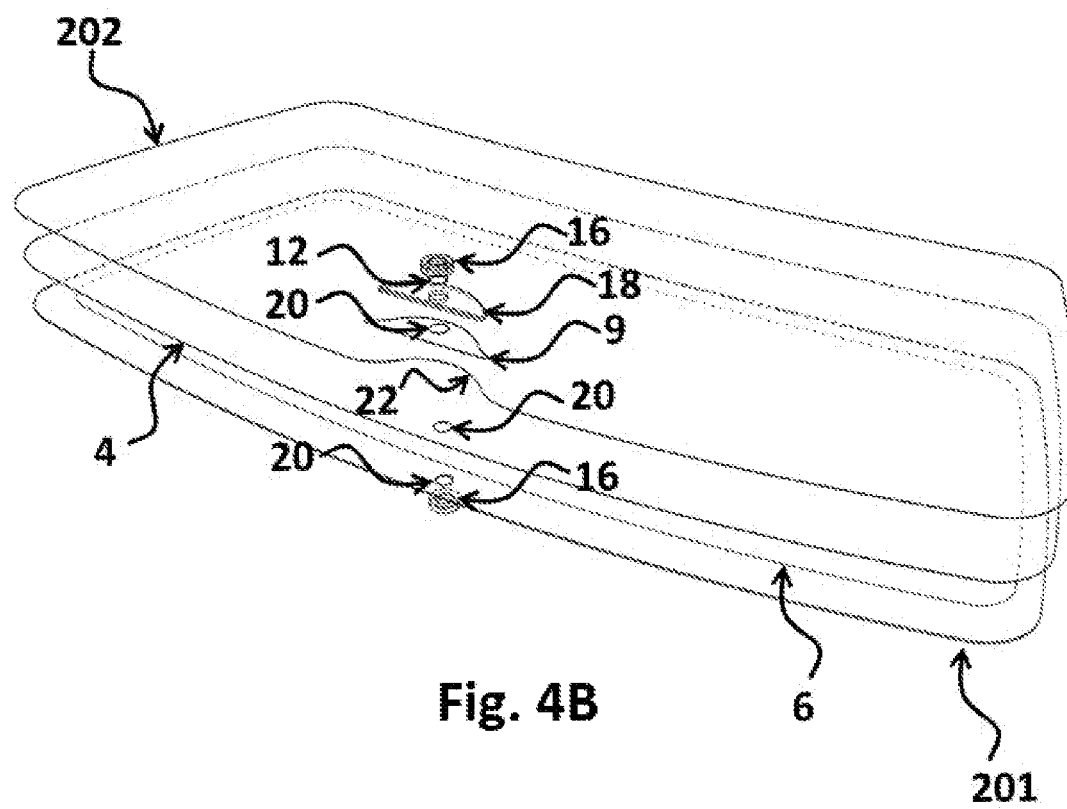
FIG. 4B shows an exploded view of the laminate of FIG. 4A.
Figure 5:
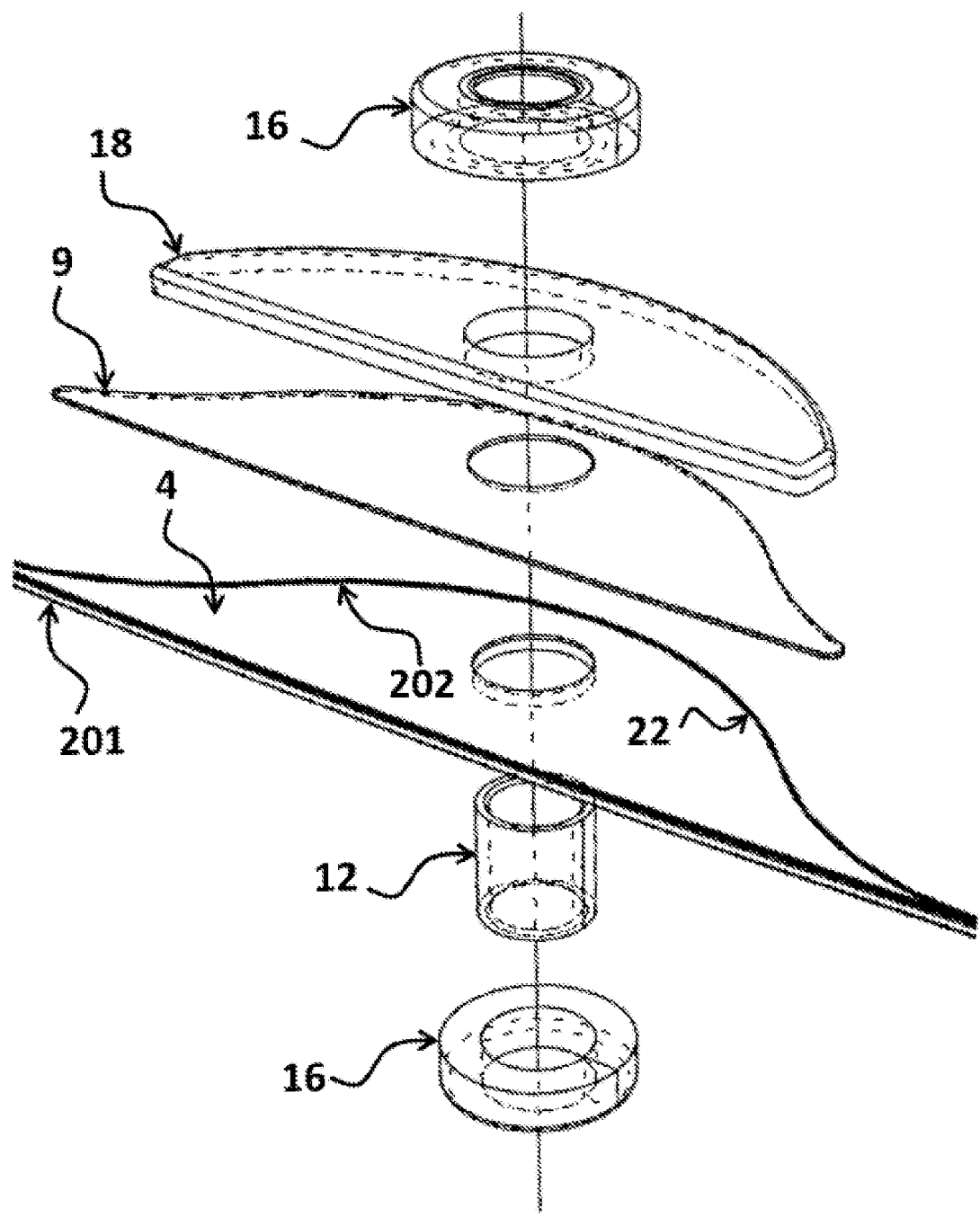
FIG. 5 shows and exploded view of a laminate with hole, cutout, insert, sleeve, retainers and plate.

As shown in FIGS. 4A, 4B and 5, the aligned holes 20 may be fitted with a sleeve 12 passing through the thickness of the glazing. Insert 9 may be provided with a reinforcement 18, to provide for added strength and support. The thickness of insert 9 may be greater than the thickness of the interior glass layer 202. Insert 9 and reinforcement 18 may be fabricated as a single part. Retainers 16 may be provided on opposite sides of the glass, attached to the sleeve 12 passing through the glass and fastened such that the glass is placed in compression further strengthening the assembly.

Insert 9 and any reinforcement 18 required can be fabricated from any suitable material that can provide the strength needed. Potential materials include but are not limited to: annealed glass, chemically strengthened glass, heat strengthened glass, carbon fiber composite, steel, aluminum, titanium, plastic and fiberglass reinforced plastic, which is selected depending on suitability and upon the exact application and loading.

The sleeve 12 and retainers 16 can be fabricated from any suitable material that can provide the strength needed. Potential materials include but are not limited to: carbon fiber composite, steel, aluminum, titanium, plastic and fiberglass reinforced plastic, which is selected depending on suitability and upon the exact application and loading.

The plastic bonding layer 4 can be used to bond the insert 9 to the surface of the exterior glass layer 201. This is particularly advantageous because the bonding can be accomplished by means of the standard automotive autoclave cycle. An autoclave is used to apply heat and pressure to an assembled laminate to complete the lamination process.

Alternately, insert 9 can be bonded to the exterior glass 201 surface using any adhesive suitable for the exemplified materials, but which are not limited to moisture cure and two component polyurethane. This step can be completed before or after the autoclave cycle.

The insert 9 may be further reinforced by the addition of additional components such as plates or other formed structures. The reinforcement 18 may be formed as an integral part of the insert. An example would be an injected molded, cast or machined reinforced insert.

The insert 9 may also be held in place by friction and pressure. In one embodiment, a sleeve 12 is inserted through the hole 20 and held in place by pressure, maintained by retainers 16 mounted to each end of the sleeve 12. Such a mechanism can be used to hold the insert in place.

EXAMPLE 1

Rear Window with a Hole

A rear window (backlite) with a hole is illustrated in FIGS. 2A, 2B, 3A and 3B. The exterior layer 201, being 2.2 mm heat strengthened soda-lime glass, has a single 28 mm hole 20 for a wiper, located near the bottom center of the window. The interior glass layer 202 is made of 1.0 mm chemically tempered aluminosilicate glass. The interior glass layer 202 does not have a hole but rather a cutout 22 (notch) that has exposes the hole 20 in the exterior layer 201 and the area around the hole 20. The cutout 22 has an inside radius of 100 mm, made to facilitate breakout of the glass and grinding of the glass edge. A 1 mm thick carbon steel insert 9 with a black powder coat, formed to the glass surface contour and containing a hole 20 that aligns with the hole 20 in the exterior layer 201. The glass layers 2 are laminated using standard autoclave heat and pressure profile. A 0.76 mm sheet of PVB plastic interlayer 4 is used to bond the two glass layers 2 to each other, and the insert 9 to the exterior layer 201. Alternatively, any suitable adhesive, such as a moisture cure or two component polyurethane, could be used to bond the insert 9. The steel insert 9 distributes the load of the wiper across a larger surface area, preventing the flexing of the glass and protecting the edge of the hole from damage. The laminate is a direct replacement for a 4 mm tempered monolithic (one glass layer) version.

EXAMPLE 2

Rear Window with a Hole and with a Reinforcement

The laminate of Example 1 is further enhanced with the addition of a reinforcement 18 to the insert 9 as show in FIGS. 4A, 4B, 5, 7A and 7B. A 3 mm thick reinforcement 18, made of a plastic plate is added behind the insert 9 to provide additional strength. The reinforcement 18 overlaps and covers the gap between the insert 9 and the edge of glass 202. The overlap area can also be bonded to the interior. A sleeve 12 made of plastic, is inserted through the hole 20 and retainers 16 made of plastic, are used on each side of the sleeve to place the assembly in compression. Any convenient means known in the art, can be used to secure the retainers 16 to the sleeve 12. The sleeve 12 may be fabricated with one retainer as an integral part of the sleeve 12. Likewise, the plate may be fabricated as an integral part of the insert 9.

Figure 6A:
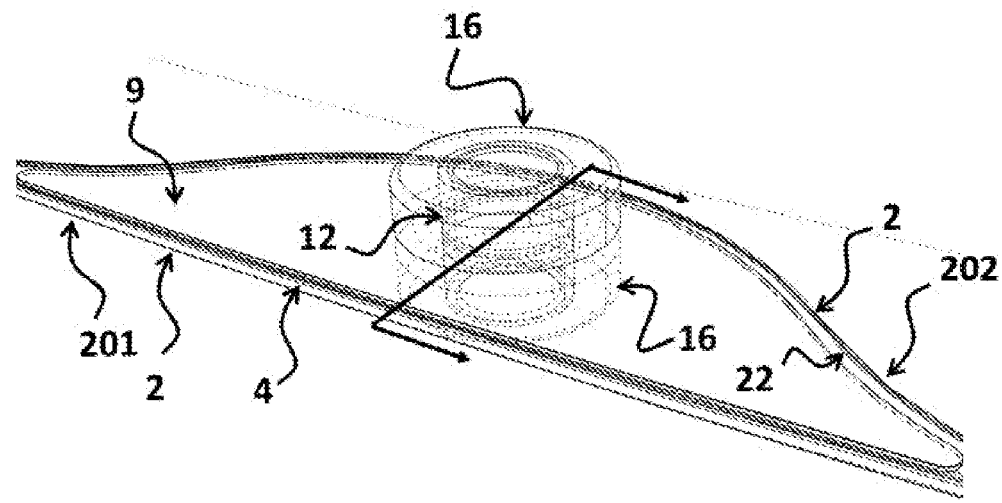
FIG. 6A shows a detail of a laminate with hole, cutout, insert, sleeve and retainers.
Figure 6B:
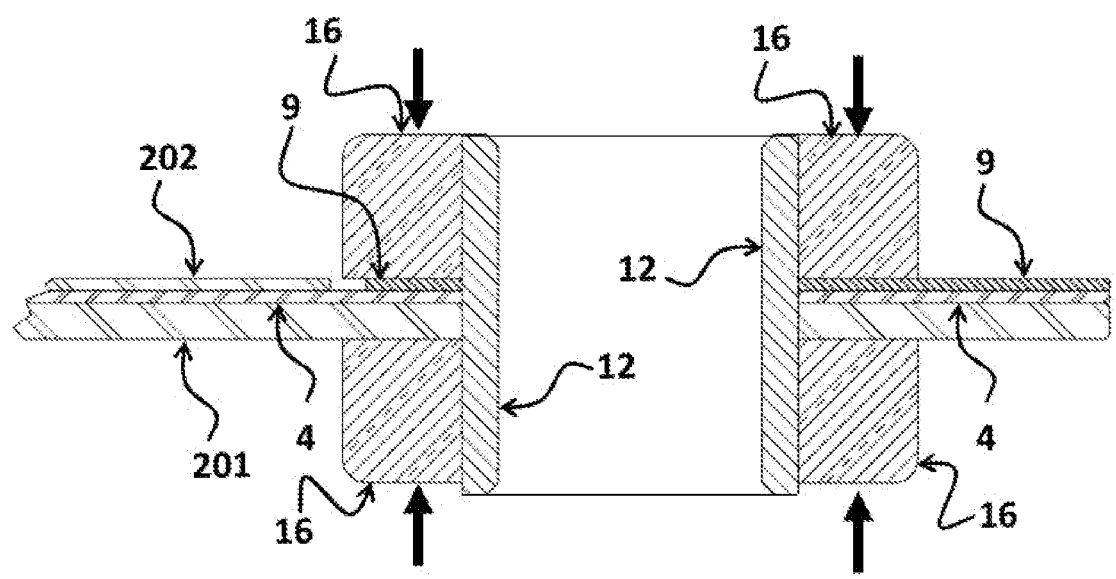
FIG. 6B shows a cross section of the laminate of FIG. 6A.
Figure 7A:
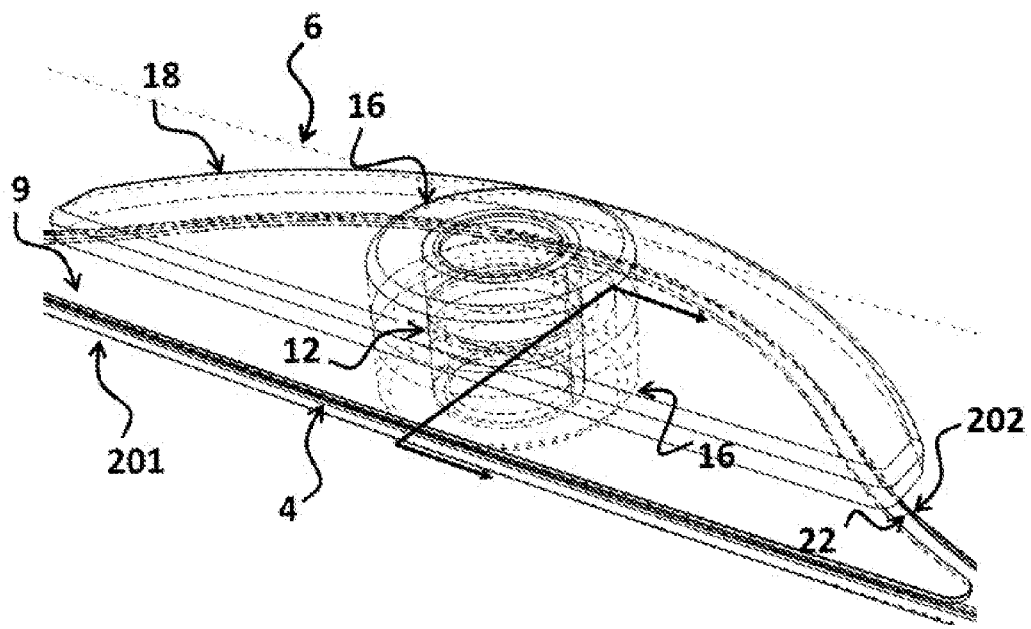
FIG. 7A shows a detail of a laminate with hole, cutout, insert, sleeve, retainers and plate.
Figure 7B:
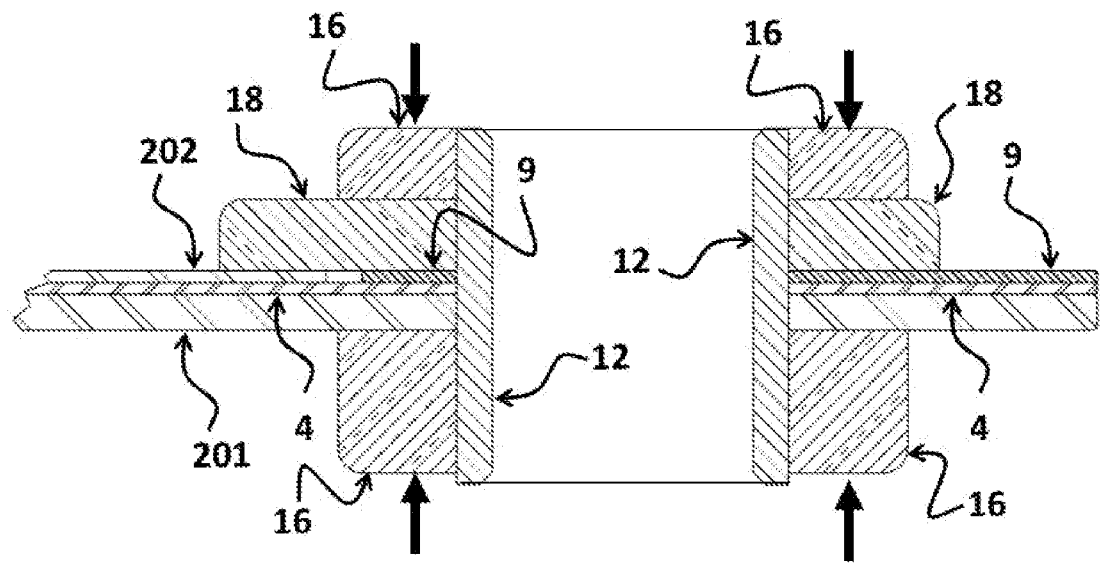
FIG. 7B shows a cross section of the laminate of FIG. 7A.

The laminate of Example 1 further enhanced with the insertion of a sleeve 12 inserted through the hole 20 and with retainers 16 used on each side of the sleeve to place the assembly in compression, is shown in FIGS. 6A and 6B.

EXAMPLE 3

Door Window with Two Holes

Figure 8A:
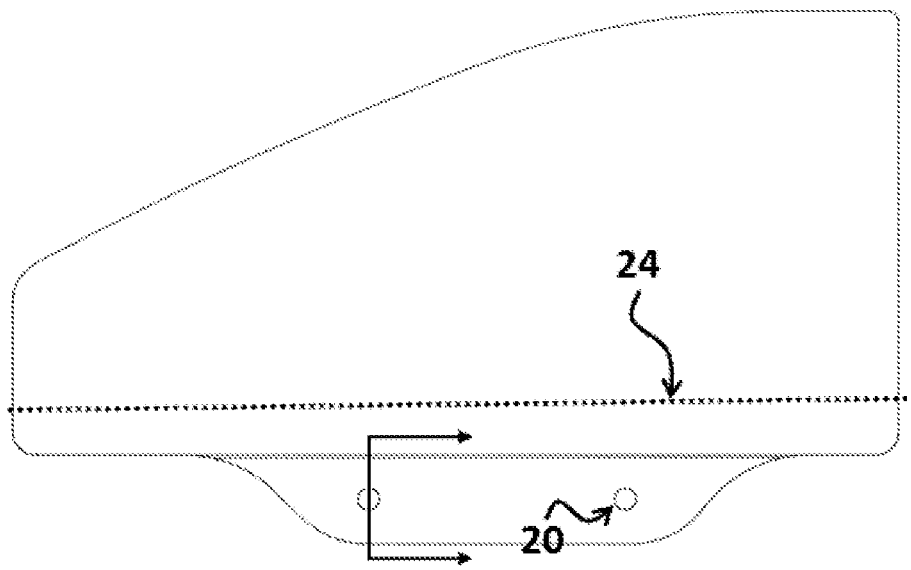
FIG. 8A shows a side view of a side window with hole, cutout and insert.
Figure 8B:
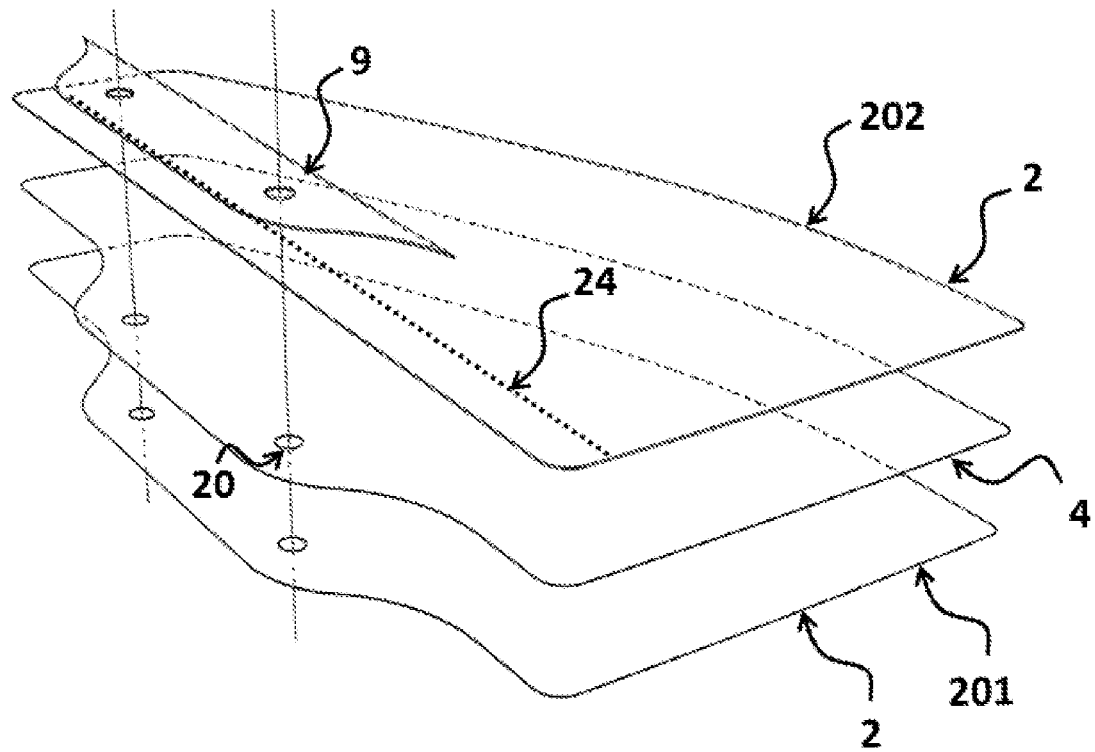
FIG. 8B shows an exploded view of the side window of FIG. 8A.
Figure 9A:
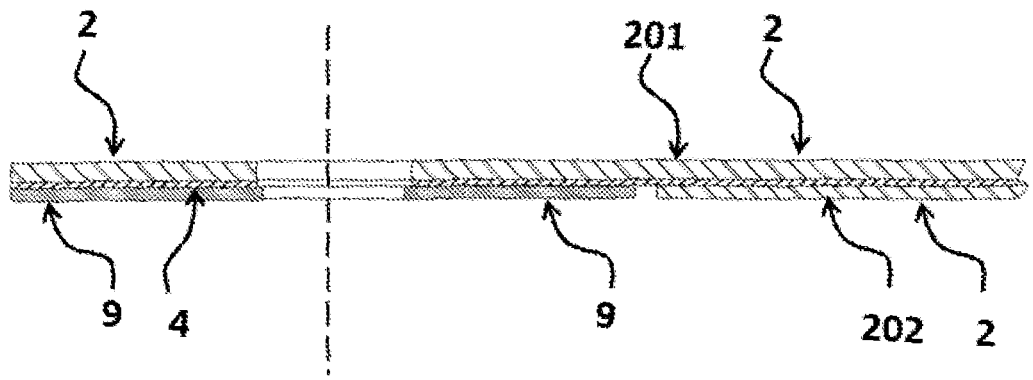
FIG. 9A shows a cross section of a side window with hole, cutout and insert.

A movable door window (sidelite) with a set of two holes 20 is illustrated in FIGS. 8A, 8B and 9A. The exterior glass layer 201 is made of 2.2 mm soda-lime glass and has two 24 mm holes 20 used to mount the glass to the lift rail in the window mechanism. The interior glass layer 202 is comprised of 1.0 mm chemically tempered aluminosilicate glass. The interior glass layer 202 does not have holes, it has rather a cutout that forms an edge 24 (beltline) that allows exposing the holes 20 in the exterior layer 201 and the area around the holes 20. The cutout is made at the edge of the "ear" containing the holes but could be placed higher up on the glass as long as it is below the beltline 24.

A 1 mm thick carbon steel insert 9 with a black powder coat, formed to the glass surface contour and containing 22 mm holes 20 aligning with the holes 20 in the exterior surface 201, is laminated to the exterior layer 201 using standard autoclave heat and pressure profile. A 0.76 mm sheet of PVB plastic interlayer 4 is used to bond the two glass layers 2 to each other, and the insert 9 to the exterior layer 201. Alternatively, any suitable adhesive, such as a moisture cure or two component polyurethane could be used to bond the insert. The steel insert 9 distributes the loading required to open and close the window across a larger surface area, prevents flexing of the glass and placing the holes through the glass in tension. The insert 9 also protects the edges of the holes from damage. The laminate is a direct replacement for a 4 mm tempered monolithic (one glass layer) version.

EXAMPLE 4

Door Window with Two Holes with Reinforcement

Figure 9B:
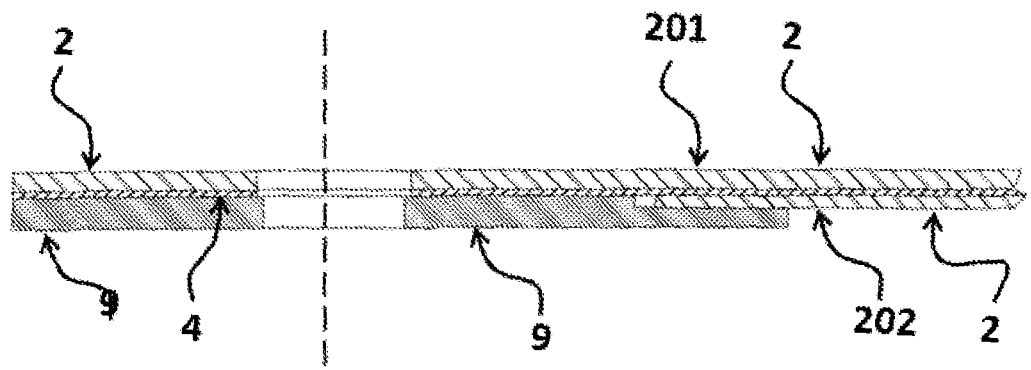
FIG. 9B shows a cross section of a side window with hole, cutout and reinforced insert.

The laminate of Example 3 is further enhanced with the addition of a reinforcement 18 to the insert, as show in FIG. 9B, where the reinforcement 18 is made by increasing the thickness of the insert 9 itself rather than as a separate component of the assembly. The insert thickness is increased to 3 mm to provide additional strength. The insert 9 also overlaps and covers the gap between insert 9 and the edge of glass 202. The overlap area of the insert can also be bonded to the interior glass layer 202 for added strength and stiffness if needed.

Figure 9C:
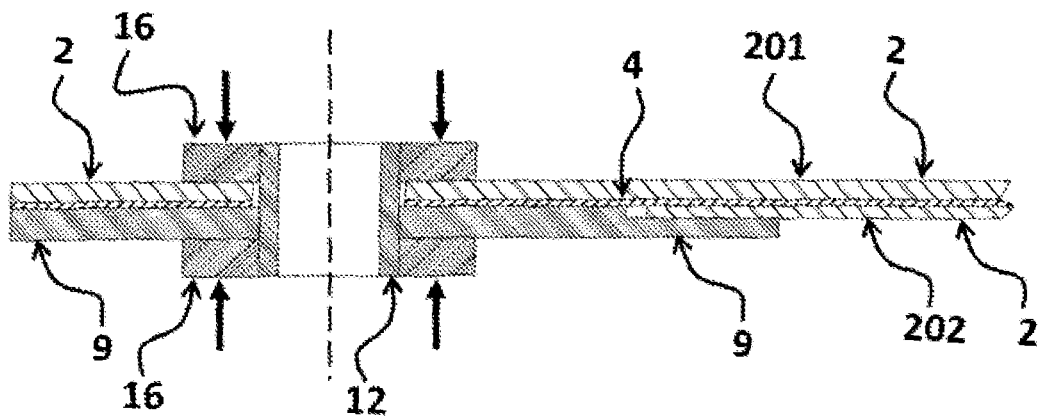
FIG. 9C shows a cross section of a side window with hole, cutout, reinforced insert, sleeve and retainers.

The laminate of Example 4 is further enhanced, as shown in FIG. 9C, with the addition of sleeves 12 made of steel, inserted through the holes 20 with retainers 16 made of steel, used on each side of the sleeve 12 to place the assembly in compression. Any convenient means, known in the art, can be used to secure the retainers to the sleeve 12. The sleeve 12 may be fabricated with one retainer as an integral part of the sleeve 12. Likewise, the plate may be fabricated as an integral part of the insert 9.

It must be understood that this invention is not limited to the embodiments described and illustrated above. A person skilled in the art will understand that numerous variations and modifications can be carried out that do not depart from the spirit of the invention, which is only defined by the following claims.

What is claimed is:

1. A laminated automotive glazing comprising:
   an exterior glass layer having inner and outer surfaces, said exterior glass layer comprising at least one hole;
   an interior glass layer having inner and outer surfaces, said interior glass layer comprising at least one cutout in an area corresponding to said at least one hole in the exterior glass layer such that said at least one cutout exposes the inner surface of the exterior glass layer in an area in and surrounding said at least one hole;
   at least one plastic bonding layer positioned between exterior and interior glass layers and serving to bond the inner surfaces of said glass layers; and
   an insert is disposed in the area corresponding to the cutout of the interior glass layer and is bonded to the inner surface of the exterior glass layer;
   wherein the insert has at least one hole in alignment with said at least one hole in the exterior glass layer.

2. The laminated glazing of claim 1, wherein said at least one hole in the insert is of a smaller diameter than said at least one hole in the exterior glass layer.

3. The laminated glazing of claim 1, wherein the insert is of a thickness that is about the same as the interior glass layer.

4. The laminated glazing of claim 1, wherein the insert is of a thickness that is greater than that of said interior glass layer.

5. The laminated glazing of claim 1, which further comprises a reinforcement, wherein the insert is positioned between the exterior glass layer and said reinforcement.

6. The laminated glazing of claim 1, which further comprises sleeve inserted through the hole and with retainers at each side of the laminated glazing, the sleeve and retainers being made of at least one of the following materials: carbon fiber composite, steel, aluminum, titanium, plastic, and fiberglass reinforced plastic.

7. The laminated glazing of claim 1, wherein the insert is substantially made of at least one of the following materials: glass, carbon fiber composite, steel, aluminum, titanium, plastic, and fiberglass reinforced plastic.

8. The laminated glazing of claim 1, wherein said insert at least partially overlaps the interior glass layer.

9. The laminated glazing of claim 1, wherein said insert at least partially overlaps the interior glass layer and said overlap is bonded to the interior glass layer.

10. The laminated glazing of claim 1, further comprising a mechanism wherein said mechanism places the exterior glass layer in compression.

11. The laminated glazing of claim 1, wherein at least one of said glass layers is chemically tempered.

12. The laminated glazing of claim 1, wherein at least one of said glass layers is heat strengthened.

13. The laminated glazing of claim 1, wherein at least one of said glass layers is less than about 1.2 mm thick.

14. The laminated glazing of claim 1, wherein at least one of said glass layers is less than about 0.7 mm thick.

15. The laminated glazing of claim 1, further comprises a performance plastic layer selected from the group of a heat absorbing layer or an infrared reflecting layer.

16. The laminated glazing of claim 1, wherein the insert is bonded to the inner surface of the exterior glass layer by said at least one plastic bonding layer using a standard automotive autoclave cycle.

17. The laminated glazing of claim 1, wherein at least one of said glass layers is comprised of an aluminosilicate glass.

18. The laminated glazing of claim 1, wherein at least one of said glass layers is comprised of a borosilicate glass.

19. The laminated glazing of claim 1 is an automotive rear window or side window.

20. The laminated glazing of claim 1, wherein a wiper or lift rail mechanism is mounted to said laminate going through said holes.

21. The laminated glazing of claim 1, wherein said insert is formed to the exterior glass layer contour.

22. The laminated glazing of claim 1, wherein the insert is bonded to the inner surface of the exterior glass layer by adhesive means.

23. The laminated glazing of claim 6, wherein the insert is held in place by friction and pressure.

24. A laminated automotive side window comprising:
   an exterior glass layer having inner and outer surfaces, said exterior glass layer comprising at least one hole;
   an interior glass layer having inner and outer surfaces, said interior glass layer comprising at least one cutout in an area corresponding to said at least one hole in the exterior glass layer such that said at least one cutout exposes the inner surface of the exterior glass layer in the areas in and surrounding said at least one hole;
   at least one plastic bonding layer positioned between the exterior and interior glass layers and serving to bond inner surfaces of said glass layers; and
   at least one insert bonded to the inner surface of the exterior glass layer; wherein each insert of said at least one insert is disposed in a respective cutout area of the interior glass layer, and has at least one hole, each hole being in alignment with a corresponding hole of the exterior glass layer.

25. The laminated automotive side window of claim 24 wherein the exterior glass layer comprises two holes.

* * * * *